United States Patent [19]

Bailly et al.

[11] Patent Number: 5,059,570

[45] Date of Patent: Oct. 22, 1991

[54] PROCESS FOR PREPARING A VANADIUM/TITANIUM BASED CATALYST SUITABLE FOR OLEFIN POLYMERIZATION

[75] Inventors: Jean-Claude A. Bailly, Martigues; Philippe Bres, Fos-sur-Mer, both of France

[73] Assignee: BP Chemicals Limited, London, England

[21] Appl. No.: 563,285

[22] Filed: Aug. 6, 1990

[30] Foreign Application Priority Data

Aug. 17, 1989 [FR] France .................................. 8911147

[51] Int. Cl.$^5$ ............................................. C08F 4/685
[52] U.S. Cl. ..................... 502/104; 502/107; 502/113; 526/116; 526/125
[58] Field of Search .................. 502/104, 107, 113

[56] References Cited

U.S. PATENT DOCUMENTS

| | | | |
|---|---|---|---|
| 3,678,019 | 7/1972 | Wagensommer | 502/113 X |
| 3,725,836 | 4/1973 | Wagensommer et al. | 502/113 X |
| 4,487,846 | 12/1984 | Bailly et al. | 502/104 X |
| 4,490,475 | 12/1984 | Bailly et al. | 502/104 X |
| 4,497,904 | 2/1985 | Blaya et al. | 502/104 |
| 4,508,844 | 4/1985 | Agapiou | 502/113 X |
| 4,511,703 | 4/1985 | Bailly et al. | 502/126 X |
| 4,525,551 | 6/1985 | Schmidt | 502/113 X |
| 4,579,833 | 4/1986 | Collomb et al. | 502/104 |

FOREIGN PATENT DOCUMENTS 0099772  2/1984  European Pat. Off.
0155770  9/1985  European Pat. Off.

*Primary Examiner*—Patrick P. Garvin
*Attorney, Agent, or Firm*—Brooks Haidt Haffner & Delahunty

[57] ABSTRACT

The present invention relates to a process for preparing a Ziegler-Natta type catalyst based on vanadium and titanium compounds precipitated on a $MgCl_2$ spherical support. The catalyst preparation consists of contacting within a liquid hydrocarbon a vanadium- and titanium-reducing agent chosen from organometallic compounds with a vanadium compound and a titanium compound, both soluble in the liquid hydrocarbon, in a molar ratio V/Ti from 70/30 to 99.5/0.5 and a support containing (i) $MgCl_2$ free from Mg-C bond and (ii) an organic electron donor compound free from labile hydrogen. The support consists of spherical particles having a well-defined diameter and a narrow particle size distribution. The catalyst is particularly suitable for manufacturing in a gas phase process elastomeric copolymers of propylene.

9 Claims, No Drawings

PROCESS FOR PREPARING A VANADIUM/TITANIUM BASED CATALYST SUITABLE FOR OLEFIN POLYMERIZATION

The present invention relates to a process for the preparation of a vanadium- and titanium-based catalyst of the Ziegler-Natta type, supported on spherical particles of magnesium chloride. This catalyst is suitable for the polymerization of olefins and is particularly adapted to the manufacture of elastomeric propylene copolymers, especially according to a gas phase copolymerization process.

It is known that catalyst systems of the Ziegler-Natta type consist of a catalyst comprising at least one compound of a transition metal, such as titanium, and of a cocatalyst comprising at least one organometallic compound of a metal such as aluminium. It is known, furthermore, that the properties of these catalysts can be greatly affected when the transition metal compound is employed with a support consisting of a solid inorganic compound, such as magnesium chloride. In the technique of preparation of a supported catalyst the properties of the support and the process for preparing the catalyst, which generally consists in fixing the transition metal compound on the said support, are of very great importance for the catalyst's characteristics and behaviour in a reaction of polymerization or copolymerization of olefins.

According to European Patent Application EP-A-0,099,772, it is known to prepare a catalyst by precipitation of a transition metal compound on a spheroidal support of magnesium chloride which includes products containing an Mg—C bond and a low proportion of an electron-donor compound. The transition metal compound is a halogenated titanium compound and the precipitation of the latter on the support is performed by a reaction of reduction of the titanium compound with a reducing agent such as an organometallic compound. This catalyst is employed for the manufacture of ethylene polymers. It has been observed, however, that it does not allow elastomeric propylene copolymers to be manufactured in satisfactory conditions.

According to European Patent Application EP-A-0,155,770, it is known to prepare a catalyst by precipitation of a vanadium compound on a spheroidal support of magnesium chloride which includes products containing an Mg—C bond and a small quantity of an electron-donor compound. The precipitation is performed by a reaction of reduction of the vanadium compound in the presence of this support, without addition of a reducing agent. The reduction reaction is in all probability initiated spontaneously by the products containing an Mg—C bond which are present in the support. The catalyst is employed for manufacturing ethylene polymers having a broad molecular weight distribution. It has been observed, however, that this process requires the use of a large quantity of the vanadium compound, only a small proportion of which is fixed on the support. Catalyst washing operations are generally necessary to remove the excess of the vanadium compound which is not fixed on the support, operations which are costly and difficult because of the toxic and corrosive nature of vanadium compounds.

A process for the manufacture of a vanadium-and titanium-based spherical catalyst supported on magnesium chloride has now been found, a process which enables the disadvantages mentioned above to be avoided. In particular, this process makes it possible to prepare a spherical catalyst containing vanadium and titanium and which exhibits a high activity in the polymerization of olefins. This catalyst is particularly adapted to the manufacture of elastomeric propylene copolymers, especially using a gas phase copolymerization process. In this case, the catalyst enables an elastomeric propylene copolymer powder to be manufactured directly in the form of spherical and nonadhesive particles, this powder having good flow properties and being easy to handle.

The subject matter of the present invention is a process for the preparation of a catalyst of Ziegler-Natta type comprising a spherical support of magnesium chloride, a process characterized in that a vanadium compound and a titanium compound are precipitated on the support by means of a reaction of reduction of vanadium and of titanium, which is carried out by bringing into contact within a liquid hydrocarbon:

a) a titanium- and vanadium-reducing agent chosen from organometallic compounds, with b) a vanadium compound and a titanium compound, both soluble in the liquid hydrocarbon and employed in such quantities that the molar ratio of the quantity of vanadium to that of titanium is between 70/30 and 99.5/0.5, and c) a solid support containing (i) from 80 to 99.5 mol % of magnesium dichloride which is substantially free from any product containing an Mg—C bond, and (ii) from 0.5 to 20 mol % of at least one organic electron-donor compound, D, free from labile hydrogen, the said solid support consisting of spherical particles which have a mass-average diameter, $D_m$, of 10 to 100 microns and a narrow particle size distribution such that the ratio of $D_m$ to the number-average diameter, $D_n$, of the particles is less than 2.

According to the present invention, the preparation of the catalyst employs a particular magnesium chloride support. The support is substantially free from products containing an Mg—C bond, which is equivalent to saying that the ratio of the number of Mg—C bonds to the number of magnesium atoms in the support is less than 0.001. The precipitation of the vanadium and titanium compounds on the support is not therefore initiated spontaneously by a reaction of reduction of the vanadium and of the titanium by a reducing agent present in the support. The reduction of the vanadium and of the titanium is performed by means of a reducing agent chosen from organometallic compounds, which is brought into contact with the particular magnesium chloride support and the vanadium and titanium compounds. One of the surprising aspects of this preparation is linked with the fact that the vanadium and titanium compounds are fixed on the solid support without being substantially precipitated beside the particles of the support and without substantially producing fine or microfine particles, which are undesirable in processes for the polymerization of olefins.

The particular magnesium chloride support includes a relatively large quantity of an organic electron-donor compound D. This characteristic contributes to promoting the fixing of a large quantity of the vanadium and titanium compounds in the support and to endowing the catalyst with a remarkable activity in the polymerization or copolymerization of olefins. The support contains from 80 to 99.5 mol % of magnesium dichloride and from 0.5 to 20 mol % of compound D. It preferably contains from 80 to 95 mol % of magnesium dichloride and from 5 to 20 mol % of compound D and yields excellent vanadium- and titanium-based catalysts for the polymerization of olefins. The best results are obtained in the manufacture of elastomeric propylene copolymers when the support employed contains from 80 to 90 mol % of magnesium dichloride and from 10 to 20 mol % of compound D.

The organic electron-donor compound, D, is known as such, or as a Lewis base. It is free from labile hydrogen and, consequently, cannot be chosen from water, alcohols or phenols, for example. It may have a relatively low complexing power in relation to magnesium dichloride. It is advantageously chosen from ethers, thioethers, sulphones, sulphoxides, phosphines, amines and amides. Ethers are preferably employed.

It has been found that the best results are obtained when the support is in the form of a homogeneous composition, that is to say a composition where the compound D is distributed homogeneously throughout the magnesium chloride particle, from the core to the periphery of the latter, and not only at its periphery. As a result, in order to obtain a support of this kind, it is recommended to prepare it by a method using a precipitation. In this case, the compound D is chosen from products likely not to react with the reactants employed by the precipitation of the support. For instance, the compound D cannot be chosen from carboxylic acid esters which react with Grignard or organomagnesium compounds.

It has been found, furthermore, that the support yields high-performance catalysts capable of withstanding the enormous growth stresses during the polymerization when it has an essentially amorphous structure, that is to say a structure where the forms of crystallinity have to a large extent or even completely disappeared. This particular form of the support can consequently be obtained only by a precipitation carried out in relatively precise conditions.

The support is additionally characterized by the fact that it consists of spherical particles which have a mass-average diameter of 10 to 100 microns, preferably of 20 to 50 microns. The particles of the support have a very narrow particle size distribution such that the ratio $D_m/D_n$ of the mass-average diameter $D_m$ to the number-average diameter $D_n$ is less than 2. More particularly, the particle size distribution of these particles may be extremely narrow, such that the ratio $D_m/D_n$ is from 1.1 to 1.5; a virtually complete absence of particles of a diameter greater than $1.5 \times D_m$ or 20 smaller than $0.6 \times D_m$ may be noted; the particle size distribution can also be assessed by the fact that more than 90% by weight of the particles of the same single batch lie within the range $D_m \pm 10\%$.

Spherical particles are intended to mean particles which are substantially spherical, that is to say whose ratio of the long axis to the short axis is equal to or less than approximately 1.5, preferably less than 1.3.

The specific surface of the support particles may be from 20 to 100 $m^2/g$ (BET), preferably from 30 to 60 $m^2/g$ (BET) and the relative density of these particles may be approximately 1.2 to 2.1.

The support may especially be prepared by reacting a dialkylmagnesium compound with an organic chlorine compound in the presence of the electron-donor compound D. the dialkylmagnesium compound chosen may be a product of formula $R_1MgR_2$, in which $R_1$ and $R_2$ are identical or different alkyl radicals containing from 2 to 12 carbon atoms. One of the important properties of this dialkylmagnesium compound is being directly soluble in the hydrocarbon medium where the preparation of the support will be carried out. The organic chlorine compound chosen is an alkyl chloride of formula $R_3Cl$ in which $R_3$ is a secondary or, preferably, tertiary alkyl radical containing from 3 to 12 carbon atoms. The electon-donor compound D employed is preferably an ether of formula $R_4OR_5$ in which $R_4$ and $R_5$ are identical or different alkyl radicals containing from 1 to 12 carbon atoms.

In addition, the various reactants used for the preparation of the support may be employed in the following conditions:

the molar ratio $R_3Cl/R_1MgR_2$ is from 1.9 to 2.5, preferably from 2 to 2.3, the molar ratio $D/D_1MgR_2$ is from 0.1 to 1.2, preferably from 0.3 to 0.8.

The reaction between $R_1MgR_2$ and $R_3Cl$ in the presence of the electron-donor compound D is a precipitation which takes place with stirring within a liquid hydrocarbon. A person skilled in the art knows that, in this case, physical factors such as the viscosity of the medium, the method and rate of stirring and the conditions of use of the reactants can play a major part in the form, the structure, the size and the particle size distribution of the precipitated particles, everything else being equal. However, to obtain an excellent support characterized especially by the presence of a large quantity of the electron-donor compound D, it is recommended to perform the precipitation reaction at a relatively low temperature, ranging from 10° to 50#C., preferably from 15° to 35° C. It is recommended, furthermore, that the precipitation reaction should take place extremely slowly, over a period of at least 10 hours, preferably a period ranging from 10 to 24 hours, so as to permit an appropriate organization of the solid product formed, in particular the insertion of a large quantity of the compound D and its uniform dispersion in the support thus formed.

The catalyst preparation process consists in precipitating a vanadium compound and a titanium compound on the magnesium chloride support within a liquid hydrocarbon. The liquid hydrocarbon may be one or more alkanes, such as n-hexane or n-heptane.

The vanadium compound and the titanium compound employed for the preparation of this catalyst may have halogens, such as chlorine or bromine, and alkoxy groups so that the overall molar ratio of the alkoxy groups to the halogens of these compounds is from 0 to 5, preferably from 0 to 1. It has been observed that if this ratio is too high the catalyst obtained exhibits an activity which is too weak to be employed for the polymerization or copolymerization of olefins.

The vanadium compound is soluble in the liquid hydrocarbon and is, in general, a compound in which the vanadium has its maximum valency, that is to say valency 4, or else those in which the vanadyl group VO has its maximum valency, that is to say valency 3. The vanadium compound employed may be a compound which has either of the two general formulae $V(OR)_{4-m}X_m$ or $VO(OR)_{3-n}X_n$ in which formulæ R denotes an alkyl group containing from 1 to 12 carbon atoms, X a halogen atom, such as bromine or chlorine, m an integral or fractional number ranging from 0 to 4 and n an integral or fractional number ranging from 0 to 3. Advantageously, one or more compounds can be employed, chosen from vanadium tetrachloride, vanadyl trichloride, vanadyl tri-n-propoxide, vanadyl triisopropoxide and vanadium tetra-n-propoxide.

The titanium compound is also a product which is soluble in liquid hydrocarbon and is generally a compound in which the titanium has its maximum valency, that is to say valency 4. The titanium compound employed may be a compound which has the general formula $Ti(OR)_{4-p}X_p$ in which R is an alkyl group containing from 1 to 12 carbon atoms, X a halogen atom, such as bromine or chlorine, and p an integral or fractional number ranging from 0 to 4. Among these compounds, titanium tetrachloride or titanium tetraisopropoxide may be employed.

The quantities of vanadium and titanium compounds which are employed to prepare the catalyst depend on the desired quantity of vanadium and titanium to be fixed in the support and on the quantity of organic electron-donor compound D present in the support. The quantity of vanadium compound to be employed during the catalyst preparation is generally from 0.05 to 2, preferably from 0.1 to 1 mole per mole of magnesium dichloride of the support.

The quantity of the titanium compound used is in particular such that the molar ratio of the quantity of vanadium employed to that of titanium is from 70/30 to 99.5/0.5, preferably from 80/20 to 98/2. It was observed, surprisingly, that when the catalyst has been prepared with such proportions of compounds, of vanadium and titanium, this catalyst becomes particularly suitable for manufacturing in gaseous phase a nonadhesive elastomeric copolymer powder which has good flow properties. It has also been noted that an elastomeric propylene copolymer prepared with such a catalyst has a relatively narrow molecular weight distribution, and this, in all probability, tends to facilitate the preparation of the polymer in gaseous phase. If the molar ratio of the vanadium and titanium compounds which are employed is too low, it is found the catalyst obtained produces relatively crystalline propylene copolymers and is relatively unsuitable for preparing propylene copolymers, especially with an unconjugated diene. On the other hand, if this ratio is too high, the catalyst obtained produces a propylens copolymer which has a broad molecular weight distribution and which is in the form of a sticky powder, difficult to prepare and to handle in a gas phase copolymerization process. The remarkable properties of this catalyst in copolymerization are also a result of the particular magnesium chloride support employed, especially of its spherical form and of the presence of a large quantity of the electron-donor compound D in the support.

The catalyst preparation process consists essentially in precipitating the vanadium and titanium compounds on the support by a reaction of reduction of the vanadium and titanium with a reducing agent chosen from organometallic compounds, in particular from organometallic compounds of metals belonging to groups II or III of the Periodic Classification of the elements. Organoaluminium, organomagnesium or organozinc compounds are preferably employed. It is possible, in particular, to employ a trialkylaluminium, such as triethylaluminium or triisobutylaluminium, or preferably an alkylaluminium halide, such as diethylalumiinium chloride. The reducing agent may be employed in a relatively small quantity if bursting of the catalyst into fine particles during the polymerization is to be avoided. The quantity of the reducing agent employed during the catalyst preparation is generally from 0.05 to 2 moles, preferably from 0.1 to 1 mole per mole of magnesium dichloride of the support. Furthermore, the catalyst may be prepared in the presence of an additional quantity of an electron-donor compound, identical with or different from that present in the support.

The preparation of the catalyst within the liquid hydrocarbon is performed by bringing the support into contact with the vanadium and titanium compounds and the reducing agent at a temperature which may be from 0° to 120° C., preferably from 50° to 90° C. The period of contact may be approximately from 0.5 to 15 hours.

In practice, the preparation of the catalyst may be performed in various ways. For example, the reducing agent, the vanadium compound and the titanium compound may be added simultaneously to a suspension of the magnesium chloride support in the liquid hydrocarbon. The mixture thus prepared may be kept stirred for a period of 0.5 to 15 hours. Another method may consist in adding the reducing agent, the vanadium compound and the titanium compound successively in any order to the suspension of the magnesium chloride support. In particular, in order to increase the quantity of vanadium and of titanium fixed in the support, it may be preferable first to place the reducing agent in contact with the suspension of magnesium chloride support and then to add the vanadium compound and the titanium compound to this suspension. In this latter case, after the reducing agent has been brought into contact with the support, the latter may be washed using a liquid hydrocarbon. The vanadium and titanium compounds may be advantageously mixed before they are brought into contact with the support. Although the major part of the quantity of the vanadium compound and of that of the titanium compound employed is fixed in the support, the catalyst may be washed one or more times with a liquid hydrocarbon.

It is found, surprisingly, that the essentially amorphous structure and the morphology of the support do not change during the preparation of the catalyst. Thus, the catalyst obtained consists of particles whose physical properties are practically identical with those of the particles of the initial support. In particular, the catalyst consists of spherical particles which have a mass-average diameter of 10 to 100 microns, preferably of 20 to 50 microns, and a very narrow particle size distribution of less than 2, as measured by the ratio of the mass-average diameter to the number-average diameter.

The advantage of this process of preparation is linked with the fact that most of the vanadium compound and of the titanium compound is fixed in the support. It is generally found that more than 80%, and even more than 90%, of the vanadium and titanium compounds are fixed in the support.

Another characteristic of this process is the ability to fix the vanadium and titanium compounds homogeneously throughout the support, thus rendering the catalyst subsequently more robust during a polymerization. In fact, the vanadium and titanium compounds are distributed homogeneously in each particle of support, from the core to the periphery of the latter. It is observed that the organic electron-donor compound D, initially present in the support, diminishes appreciably in the catalyst. From this it may be concluded that the vanadium and titanium compounds can be fixed in the support wherever the compound D leaves a vacancy. It is observed, furthermore, that the catalyst includes a part of the reducing agent employed during the precipitation, but in a form converted by the reduction reaction. The catalyst thus obtained may contain, per mole of magnesium dichloride, from 0.05 to 2 moles of vanadium, essentially in the reduced state, from $2.5 \times 10^{-4}$ to 0.85 moles of titanium, essentially in the reduced state, from 0.01 to 0.1 mole of the organic electron-donor compound D and from 0.05 to 1 mole of reducing agent in a form converted by the reduction reaction.

The catalyst of the present invention can be employed for polymerizing or copolymerizing under industrial conditions a large number of olefins containing from 2 to 12 carbon atoms, such as ethylene, propylene, 1-butene, 1-hexene, 4-methyl-1-pentene or 1-octene. It is particularly suitable for the manufacture of elastomeric propylene copolymers, especially those containing from 30% to 70% by weight of propylene and from 70% to 30% by weight of ethylene and/or of 1-butene and optionally an unconjugated diene, such as ethylidenenorbornene, 4-methyl-1,4-hexadiene and 2-methyl-1,5-hexadiene or 1,4-hexadiene. The elastomeric copolymers may be advantageously manufactured in a gaseous phase in a fluidized and/or mechanically stirred bed reactor. The propylene copolymerization reaction is performed by employing the catalyst together with a cocatalyst chosen from the organometallic compounds of a metal belonging to groups I to III of the Periodic Classification of the elements, and advantageously with an activator chosen from halogenated hydrocarbons. The catalyst and the cocatalyst are generally employed in proportions such that the molar ratio of the quantity of metal of the cocatalyst to the quantity of vanadium and titanium of the catalyst is between 0.5 and 50. The copolymerization reaction may be performed at a temperature of approximately between 0° C. and 60° C., at a total pressure ranging from 0.1 to 5 MPa.

The catalysts prepared according to the invention can be used directly or after having been subjected to an olefin prepolymerization operation carried out in one or more stages in a gaseous phase and/or in suspension in a liquid hydrocarbon medium. The prepolymerization operation results in an increase in the size of the catalyst particles while preserving the morphology of the latter. It consists in bringing the catalyst and the cocatalyst into contact with one or more olefins. The prepolymerization reaction may be conducted while maintaining a suitable activity of the catalyst until 10 to 500 g and preferably 30 to 250 g of polyolefin is obtained per millimole of vanadium and titanium.

During the propylene copolymerization reaction a uniform development of each copolymer particle is observed and an elastomeric propylene copolymer is obtained, consisting of a nonadhesive powder which has good flow properties and a high bulk density, generally of between 0.3 and 0.5 g/cm$^3$. The copolymer has a relatively narrow molecular weight distribution, characterized by a ratio of the weight-average molecular weight Mw to the number-average molecular weight Mn of between 6 and 11. Furthermore, it may contain a very low proportion of transition metal, generally less than 15 parts per million be weight.

Method of determining the mass-average (Dm) and number-average (Dn) diameters of particles.

According to the invention, the mass-average (Dm) and number-average (Dn) diameters of the support or catalyst particles are measured on the basis of microscopic observations using the Optomax image analyser (Micro-Measurements Ltd., Great Britain). The principle of the measurement consists in obtaining, from the experimental study of a population of particles using optical microscopy, a frequency table which gives the number ($n_i$) of particles belonging to each class (i) of diameters, each class (i) being characterized by an intermediate diameter ($d_i$) included within the limits of the said class. According to approved French Standard NF X 11-630 of June 1981, Dm and Dn are given by the following formulae:

$$\text{mass average diameter: } Dm = \frac{\Sigma n_i (d_i)^3 d_i}{\Sigma n_i (d_i)^3}$$

$$\text{number-average diameter: } Dn = \frac{\Sigma n_i \cdot d_i}{\Sigma n_i}$$

The ratio Dm/Dn characterizes the particle size distribution; it is sometimes called "width of the particle size distribution". The measurement using the Optomax image analyser is carried out by means of an inverted microscope which permits the examination of the suspensions of support or catalyst particles with a magnification of between 16 and 200 times. A television camera picks up the images given by the inverted microscope and transmits them to a computer which analyses the images received line by line and point by point on each line, in order to determine the particle dimensions or diameters and then to classify them.

The following nonlimiting examples illustrate the invention.

EXAMPLE 1

Preparation of a support 10.2 liters of a mixture containing 10 moles of dibutyl-magnesium in n-hexane, 6.45 liters of n-hexane and, lastly, 1 liter of diisoamyl ether are introduced in succession during a first stage under nitrogen, at ambient temperature, into a 30-liter stainless steel reactor equipped with a stirring system rotating at a speed of 600 revolutions per minute and with a jacket. In a second stage, where the speed of the stirring system is maintained at 600 revolutions per minute and the temperature of the reactor at 25° C., 2.4 l of tert-butyl chloride are added at a constant rate over 12 hours to the mixture thus obtained. At the end of this time the reaction mixture is kept at 25° C. for 3 hours. The precipitate obtained is washed with 15 liters of n-hexane. Washing of the precipitate is repeated 6 times. The solid product obtained forms the magnesium dichloride support (A), containing 0.12 moles of diisoamyl ether per mole of magnesium dichloride and less than 0.001 mole of Mg—C bond. Under microscopic examination the support (A) has the form of spherical particles with a mass-avereage diameter of 21 microns and an extremely narrow particle size distribution, such that the ratio Dm/Dn of the particles is equal to 1.4.

The specific surface of the support (A) is approximately 0.45 m$^2$/g (BET). The structure of the magnesium chloride in the support is essentially amorphous.

EXAMPLE 2

Preparation of a catalyst (B)

A suspension of the support (A) prepared in Example 1, containing 0.1 mole of magnesium dichloride in 150 ml of n-hexane is introduced at ambient temperature and under a nitrogen atmosphere into a one-liter glass reactor equipped with a stirring system rotating at a speed of 250 revolutions per minute. 100 ml of a solution containing 0.2 moles/liter of diethylaluminium chloride in n-hexane are added over one hour to this suspension, which is kept stirred and at ambient temperature (25° C.). The mixture is then kept stirred for 2 hours at 35° C. At the end of this time the suspension, kept stirred, is heated to a temperature of 50° C. and 50 ml of a solution containing 0.4 moles/liter of vanadyl trichloride in n-hexane and 50 ml of a solution containing 0.02 moles/liter of titanium tetrachloride in n-hexane are added to it over 4 hours. A new suspension is thus obtained, which is kept stirred for a period of 2 hours at a temperature of 80° C. The stirring is then stopped and the catalyst (B) obtained is allowed to settle. After removal of the supernatant liquid phase, the catalyst (B) is subjected to 2 successive washings, 200 ml of n-hexane at 50° C. being used each time, and then to 3 successive washings, 500 ml of n-hexane at 25° C. being used each time. The catalyst (B) is collected and stored under a nitrogen atmosphere. Its characteristics are collated in Table 1.

EXAMPLE 3

Preparation of a catalyst (C)

The operation is carried out exactly as in Example 2, except for the fact that after having added the solution of diethylaluminium chloride in n-hexane to the magnesium chloride suspension, 45 ml instead of 50 ml of a solution containing 0.4 mole/l of vanadyl trichloride are employed, and 50 ml of a solution containing 0.04 mole/l instead of 0.02 mole/l of titanium tetrachloride in n-hexane. The characteristics of the catalyst (C) obtained are collated in Table 1.

EXAMPLE 4

Preparation of a catalyst (D)

The operation is carried out exactly as in Example 2, except for the fact that, after having added the solution of diethylaluminium chloride in n-hexane to the magnesium chloride suspension, 50 ml of a solution containing 0.02 mole/l of titanium tetra-n-propoxide in n-hexane are employed, instead of 50 ml of a solution containing 0.02 mole/l of titanium tetrachloride in n-hexane. The characteristics of the catalyst (D) obtained are collated in Table 1.

EXAMPLE 5

Preparation of a catalyst (E)

The operation is carried out exactly as in Example 2, except for the fact that, after having added the solution of diethylaluminium chloride in n-hexane to the suspension of magnesium chloride, 100 ml of a solution containing 0.02 mole/l of vanadyl trichloride and 0.01 mole/l of titanium tetrachloride is employed, instead of 50 ml of a solution containing 0.4 mole/l of vanadyl trichloride in n-hexane, and 50 ml of a solution containing 0.02 mole/l of titanium tetrachloride in n-hexane. The characteristics of the catalyst (E) obtained are collated in Table 1.

EXAMPLE 6

Preparation of a catalyst (F)

The operation is carried out exactly as in Example 2, except for the fact that, after having added the solution of diethylaluminium chloride in n-hexane to the magnesium chloride suspension, 50 ml of a solution containing 0.02 mole/l of titanium tetra-n-butoxide in n-hexane are employed, instead of 50 ml of a solution containing 0.02 moles/liter of titanium tetrachloride in n-hexane. The characteristics of the catalyst (F) obtained are collated in Table 1.

EXAMPLE 7

Preparation of a catalyst (G)

The operation is carried out exactly as in Example 2, except for the fact that, after having added the solution of diethylaluminium chloride in n-hexane to the magnesium chloride suspension, 50 ml of a solution containing 0.02 mole/l of titanium tetraiso propoxide are employed, instead of titanium tetrachloride in n-hexane. The characteristics of the catalyst (G) obtained are collated in Table 1.

EXAMPLE 8

Preparation of a catalyst (H)

A suspension of the support (A) prepared in Example 1, containing 0.1 mole of magnesium dichloride in 150 ml of n-hexane is introduced at ambient temperature and under a nitrogen atmosphere into a one-liter glass reactor equipped with a stirring system rotating at a speed of 250 revolutions per minute. 100 ml of a solution containing 0.2 moles/liter of diethylaluminium chloride in n-hexane are added over one hour to this suspension, which is kept stirred and at ambient temperature (25° C.). The mixture thus obtained is then stirred for 2 hours at 35° C. At the end of this time it is heated to a temperature of 50° C. and 100 ml of a solution containing 0.2 mole/l of vanadyl trichloride is added to it over 4 hours, it is then kept at 80° C. for two hours and at the end of this time the solid obtained is washed twice with 200 ml of n-hexane so as to obtain a second mixture, to which 12.5 ml of a solution containing 0.02 mole/l of titanium tetrachloride are added at ambient temperature (25° C.) over 1 hour. A new suspension is thus obtained, which is kept stirred for a period of one hour at a temperature of 40° C. The stirring is then stopped and the catalyst (H) obtained is allowed to settle. After removal of the supernatant liquid phase, the catalyst (H) is subjected to two successive washings, 200 ml of n-hexane being used each time. The properties of the catalyst (H) obtained are collated in Table 1.

EXAMPLE 9

Preparation of a catalyst (I)

The operation is carried out exactly as in Example 8, except for the fact that 25 ml, instead of 12.5 ml, of a solution containing 0.02 mole/l of titanium tetrachloride in n-hexane are employed, the properties of the catalyst (I) obtained are collated in Table 1.

EXAMPLE 10

Preparation of an ethylene prepolymer 2 litres of n-hexane, 4 millimoles of diethylaluminium chloride, g millimoles of triethylaluminium and a quantity of the catalyst prepared in Example 2 containing 4 millimoles of transition metal (vanadium and titanium) are introduced under a nitrogen atmosphere into a 5-liter stainless steel reactor equipped with a stirring system rotating at 750 revolutions per minute and kept at 60° C. 1 liter of hydrogen, measured under normal temperature and pressure conditions, is then introduced into the reactor, followed by ethylene at a uniform rate of 80 g/h for 4 hours. At the end of this time and after returning to ambient temperature the contents of the reactor are transferred to a rotary evaporator to remove all the solvent. Under these conditions, a dry prepolymer is recovered, which is in the form of a powder having good flow properties and which is stored under nitrogen.

Polymerization of ethylene in the gaseous phase

A powder charge of 200 g of a perfectly inert and anhydrous polyethylene powder, a quantity of prepolymer prepared previously containing 0.1 millimole of transition metal (vanadium and titanium), 1 millimole of triisobutylaluminium and, lastly, a volume of hydrogen such as to obtain a partial pressure of 0.1 MPa are introduced under a nitrogen atmosphere into a 2.6-liter stainless steel reactor equipped with a stirring device for dry powder, rotating at a speed of 250 revolutions per minute. The reactor is then heated to 80 ° C. and ethylene is introduced into it until a total pressure of 0.5 MPa is obtained, which is kept constant throughout the polymerization period. After 5 hours' reaction, 700 g of polyethylene are recovered with the following characteristics:
- transition metal content: 10 ppm
- bulk density: 0.44 g/cm$^3$
- melt index measured at 190° C. under a 5-kg load (MI$_{5/190}$): 4.2 g/10 minutes
- mass-average particle diameter Dm: 305 microns

EXAMPLE 11

Polymerization of ethylene in suspension in n-hexane 2 liters of n-hexane and 5 millimoles of tri-n-octylaluminium are introduced in succession under a nitrogen atmosphere into a 5-liter stainless steel reactor equipped with a stirring system rotating at 750 revolutions per minute and kept at a temperature of 70° C., followed by a quantity of the catalyst (C) prepared in Example 3 containing 0.5 millimoles of transition metal (vanadium and titanium), hydrogen so as to obtain a partial pressure of 0.15 MPa, and, lastly, ethylene at a uniform rate of 160 g/h for 3 hours. Under these conditions 480 g are collected of a polyethylene powder which has the following characteristics:
- transition metal content: 50 ppm
- bulk density: 0.44g/cm$^3$
- MI$_{5/190}$: 0.9 g/10 minutes
- mass-average Particle diameter: 280 microns
- ratio of the weight molecular weight Mw to the number molecular weight Mn: 8.5.

EXAMPLE 12

Preparation of a prepolymer of ethylene and of propylene 2 liters of n-hexane, 12 millimoles of triisobutylaluminium, 40 millimoles of chloroform and a quantity of the catalyst prepared in Example 4 containing 4 millimoles of transition metal (vanadium and titanium) are introduced in succession under a nitrogen atmosphere into a 5-liter stainless steel reactor equipped with a stirring system rotating at 750 revolutions per minute and kept at 35° C., followed finally by a mixture containing ethylene and propylene in a molar ratio of 95/5 at a uniform rate of 80 g/h. After 4 hours' reaction, a prepolymer is recovered, which is in the form of a powder with good flow properties.

Gas phase copolymerization of propylene and 1-butene

A powder charge of 200 g of a propylene and 1-butene copolymer powder originating from a previous reaction, perfectly inert and anhydrous, a quantity of the prepolymer prepared previously containing 0.1 millimole of transition metal (vanadium and titanium), 1.5 millimoles of triisobutylaluminium, 3 millimoles of chloroform and hydrogen so as to obtain a partial pressure of 0.02 MPa are introduced under a nitrogen atmosphere into a 2.6-liter stainless steel reactor equipped with a stirring system for dry powder, rotating at a speed of 250 revolutions per minute, the reactor is then heated to 50° C. and a gas mixture containing propylene and 1-butene in a molar ratio of 70/30 is introduced into it until a total pressure of 0.5 MPa is obtained, and this is kept constant throughout the copolymerization period by continuously introducing this gas mixture into the reactor. At the end of 6 hours' reaction, 540 g are recovered of copolymer in the form of a powder which has the following characteristics:
- transition metal content: 15 ppm
- MI$_{5/190}$: 0.3 g/10 minutes
- weight content of units derived from 1-butene: 28%
- mass-average particle diameter: 245 microns

EXAMPLE 13

Preparation of a prepolymer of ethylene and of propylene

The operation is carried out exactly in Example 12, except that the catalyst prepared in Example 5 is employed instead of the catalyst prepared in Example 4.

Copolymerization of ethylene and of propylene in the gaseous phase

A powder charge of 150 g of a perfectly inert and anhydrous copolymer powder originating from a previous reaction, a quantity of prepolymer, prepared previously and containing 0.1 millimole of transition metal (vanadium and titanium), 4 millimoles of triisobutylaluminium, 6 millimoles of chloroform and hydrogen so as to obtain a partial pressure of 0.025 MPa are introduced under a nitrogen atmosphere into a 2.6-liter stainless steel reactor equipped with a stirring device for dry powder, rotating at a speed of 250 revolutions per minute. The reactor is then heated to 40° C. and a gas mixture containing ethylene and propylene in a molar ratio of 70/30 is introduced into it until a total pressure of 0.5 MPa is obtained, which is kept constant throughout the copolymerization period by introducing this gas mixture continuously into the reactor. At the end of 6 hours' reaction, 600 g of copolymer are recovered in the form of a powder which has the following characteristics:
- transition metal content: 11 ppm
- bulk density: 0.43 g/cm$^3$
- viscosimetry molecular weight as polyethylene equivalent: 510,000.
- weight content of ethylene-derived units: 63%
- degree of crystallinity: 0.8%
- mass-average particle diameter Dm: 290 microns
- Mw/Mn: 9.2

EXAMPLE 14

Preparation of a prepolymer of ethylene and of propylene

The operation is carried out exactly as in Example 12, except for the fact that the catalyst prepared in Example 6 is employed instead of the catalyst prepared in Example 4.

Copolymerization of ethylene and of propylene in the gaseous phase

A powder charge of 200 g of an inert and perfectly anhydrous powder of a copolymer originating from a previous reaction, a quantity of previously prepared prepolymer containing 0.1 millimole of transition metal (vanadium and titanium), 2 millimoles of triisobutylaluminium, 4 millimoles of chloroform and a volume of hydrogen so as to obtain a partial pressure of 0.03 MPa are introduced under a nitrogen atmosphere into a 2.6-liter stainless steel reactor equipped with a stirring system for dry powder rotating at a speed of 250 revolutions per minute. The reactor is then heated to 45° C. and a gas mixture of ethylene and propylene in a molar ratio of 60/40 is introduced into it until a total pressure of 0.5 MPa is obtained, which is kept constant throughout the copolymerization reaction period by introducing this gas mixture continuously into the reactor. At the end of 6 hours' reaction, 620 g of a copolymer are recovered in the form of a powder which has the following characteristics:
- transition metal content: 12 ppm
- $MI_5/_{190}$: 0.2 g/10 minutes
- weight content of ethylene-derived units: 53%
- degree of crystallinity: 0.8%
- Dm: 290 microns
- Mw/Mn: 8.1

EXAMPLE 15

Preparation of a prepolymer of ethylene and of propylene

The operation is carried out exactly as in Example 12, except
for the fact that the catalyst prepared in Example 7 is employed instead of that prepared in Example 4.

Gas phase copolymerization of ethylene, propylene and ethylidenenorbornene

A powder charge of 150 g of an inert and perfectly anhydrous copolymer powder originating from a previous reaction, a quantity of previously prepared prepolymer containing 0.1 millimole of transition metal (vanadium and titanium), 4 millimoles of triisobutylaluminium, 12.5 millimoles of chloroform and hydrogen so as to obtain a partial hydrogen pressure of 0.009 MPa are introduced under a nitrogen atmosphere into a 2.5-liter stainless steel reactor equipped with a stirring system for dry powder rotating at a speed of 250 revolutions per minute. The reactor is then heated to 35° C. and a gas mixture containing ethylene and propylene in a molar ratio of 75/25 is introduced into it continuously so as to maintain a constant total pressure of 0.5 MPa and, intermittently, 36 g of ethylidenenorbornene (ENB). At the end of 10 hours' reaction, 510 g of a non adhesive copolymer are obtained in the form of a powder which has the following characteristics:
- transition metal content: 14 ppm
- $MI_5/_{190}$: 0.2 g/10 minutes
- viscosimetry molecular weight as polyethylene equivalent: 440,000
- weight content of ethylene-derived units: 63%
- bulk density: 0.36 g/cm$^3$
- DM: 265 microns

EXAMPLE 16

Preparation of a prepolymer of ethylene and of propylene

The operation is carried out exactly as in Example 12, except for the fact that the catalyst prepared in Example 8 is employed instead of that prepared in Example 4.

Gas phase copolymerization of ethylene and of propylene

The operation is carried out exactly as in Example 13, except for the fact that the previously prepared prepolymer is employed instead of the prepolymer prepared in Example 13, the fact that the gas mixture contains ethylene and propylene in a molar ratio of 60/40 instead of 70/30 and the fact that hydrogen is introduced so as to obtain a partial pressure of 0.08 MPa instead of 0.025 MPa. Under these conditions, after 6 hours' reaction, 550 g of a nonadhesive copolymer are recovered in the form of a powder which has the following characteristics:
- transition metal content: 14 ppm
- bulk density: 0.39 g/cm$^3$
- viscosimetry molecular weight as polyethylene equivalent: 250,000
- weight content as ethylene: 52%
- degree of crystallinity: 0.4%
- mass-average particle diameter, Dm: 290 microns
- Mw/Mn: 7.8.

EXAMPLE 17

Preparation of a prepolymer of ethylene and of propylene

The operation is carried out exactly as in Example 12, except for the fact that the catalyst prepared in Example 9 is employed instead of that prepared in Example 4.

Gas phase copolymerization of ethylene and of propylene

The operation is carried out exactly as in Example 13, except for the fact that the previously prepared prepolymer is employed instead of the prepolymer prepared in Example 13 and the fact that the gas mixture contains ethylene and propylene in a molar ratio of 80/20 instead of 70/30. Under these conditions, after 6 hours' reaction, 635 g of a copolymer are recovered in the form of a powder which has the following characteristics:
- transitional metal content: 11 ppm
- bulk density: 0.44 g/cm$^3$
- viscosimetry molecular weight as polyethylene equivalent: 530,000
- weight content of ethylene-derived units: 74%
- mass-average particle diameter, Dm: 295
- Mw/Mn: 7.1

TABLE 1

| Example | Characteristics of the catalysts | | | | | |
|---|---|---|---|---|---|---|
| | V/Mg | Ti/Mg | $V^{3+}$ + $Ti^{3+}$/Mg | Al/Mg | OR/MgMg | D/Mg |
| 2 | 0.135 | 0.0097 | 0.088 | 0.121 | 0 | 0.04 |
| 3 | 0.126 | 0.02 | 0.038 | 0.098 | 0 | 0.03 |
| 4 | 0.138 | 0.0077 | 0.0675 | 0.115 | 0.03 | 0.035 |

TABLE 1-continued

| Example | Characteristics of the catalysts | | | | | |
|---|---|---|---|---|---|---|
| | V/Mg | Ti/Mg | $V^{3+} + Ti^{3+}$/Mg | Al/Mg | OR/MgMg | D/Mg |
| 5 | 0.149 | 0.01 | 0.0875 | 0.11 | 0 | 0.04 |
| 6 | 0.127 | 0.0068 | 0.0697 | 0.119 | 0.03 | 0.032 |
| 7 | 0.147 | 0.0071 | 0.084 | 0.125 | 0.033 | 0.04 |
| 8 | 0.170 | 0.01 | 0.081 | 0.09 | 0 | 0.037 |
| 9 | 0.170 | 0.02 | 0.133 | 0.12 | 0 | 0.035 |

We claim:

1. Process for the preparation of a catalyst of Ziegler-Natta type comprising a spherical support of magnesium chloride, a process characterized in that a vanadium compound and a titanium compound are precipitated on the support by means of a reaction of reduction of vanadium and of titanium, which is carried out by bringing into contact within a liquid hydrocarbon:
   a) a titanium- and vanadium-reducing agent chosen from organometallic compounds, with
   b) a vanadium compound and a titanium compound, both soluble in the liquid hydrocarbon and employed in such quantities that the molar ratio of the quantity of vanadium to that of titanium is between 70/30 and 99.5/0.5 and
   c) a solid support containing (i) from 80 to 99.5 mol % of magnesium dichloride which is substantially free from any product containing an Mg—C bond, and (ii) from 0.5 to 20 mol % of at least one organic electron-donor compound, D, free from labile hydrogen, the said solid support consisting of spherical particles which have a mass-average diameter, Dm, of 10 to 100 microns and a narrow particle size distribution such that the ratio of Dm to the number-average diameter, Dn, of the particles is less than 2.

2. Process according to claim 1, characterized in that the support contains from 80% to 95 mol % of magnesium dichloride and from 5 to mol % of the organic electron-donor compound D.

3. Process according to claim 1, characterized in that the vanadium compound and the titanium compound have alkoxy groups OR and halogens X so that the overall molar ratio of the alkoxy group to the halogens of these compounds is from 0 to 5.

4. Process according to claim 3, characterized in that the vanadium compound corresponds to either of the two general formulae:

$$V(OR)_{4-m}X_m \text{ or } VO(OR)_{3-n}X_n$$

in which formulae R denotes an alkyl radical containing from 1 to 12 carbon atoms, X a halogen atom, m an integral or fractional number ranging from 0 to 4 and n an integral or fractional number ranging from 0 to 3.

5. Process according to claim 3, characterized in that the
   titanium compound corresponds to the general formula $Ti(OR)_{4-p}X_p$ in which R denotes an alkyl radical containing from 1 to 12 carbon atoms, X a halogen atom, and p an integral or fractional number ranging from 0 to 4.

6. Process according to claim 1, characterized in that the vanadium- and titanium-reducing agent is chosen from organoaluminium, organomagnesium and organozinc compounds.

7. Process according to claim 1, characterized in that 0.05 to 2 moles of reducing agent per mole of magnesium dichloride of the support are brought into contact.

8. Process according to claim 1, characterized in that from 0.05 to 2 moles of the vanadium compound per mole of magnesium dichloride of the support are brought into contact.

9. Process according to claim 1, characterized in that the bringing into contact is carried out at a temperature ranging from 0° C. to 120° C., for a period ranging from 0.5 to 15 hours.

* * * * *

UNITED STATES PATENT AND TRADEMARK OFFICE
CERTIFICATE OF CORRECTION

PATENT NO. : 5,059,570

DATED : October 22, 1991

INVENTOR(S) : Jean-Claude A. Bailly, et al

It is certified that error appears in the above-identified patent and that said Letters Patent is hereby corrected as shown below:

Col. 3, line 50, should read "1.5xDM or smaller than"

Col. 5, line 43, correct the spelling of the word "propylene"

Col. 7, line 60, change "be" to --by--

Col. 10, line 60, should read "8 millimoles"

Col. 11, line 9, correct the spelling of "gaseous"

Col. 11, line 50, correct the spelling of "particle"

Col. 13, line 11, correct the spelling of "gaseous"

Col. 14, between lines 3 and 4, insert "degree of crystallinity: 1%"

Col. 14, line 56, should read "transition metal"

Claim 2, line 3, after "to" and before "mol" insert --20--

Signed and Sealed this

Twenty-eighth Day of January, 1992

*Attest:*

HARRY F. MANBECK, JR.

*Attesting Officer*      *Commissioner of Patents and Trademarks*